US011388374B2

(12) United States Patent
Tong

(10) Patent No.: US 11,388,374 B2
(45) Date of Patent: Jul. 12, 2022

(54) TRANSMITTERS AND RECEIVERS FOR TRANSMISSION OF VIDEO AND OTHER SIGNALS BY FIBER OPTIC CABLE

(71) Applicant: Celerity Technologies Inc., Irvine, CA (US)

(72) Inventor: Xiaolin Tong, Irvine, CA (US)

(73) Assignee: Celerity Technologies Inc., Irvine, CA (US)

( * ) Notice: Subject to any disclaimer, the term of this patent is extended or adjusted under 35 U.S.C. 154(b) by 203 days.

(21) Appl. No.: 16/898,793

(22) Filed: Jun. 11, 2020

(65) Prior Publication Data

US 2021/0392300 A1    Dec. 16, 2021

(51) Int. Cl.
*H04B 10/00* (2013.01)
*H04N 7/22* (2006.01)
*H04B 10/25* (2013.01)
*G02B 6/38* (2006.01)
*G02B 6/42* (2006.01)
*H01R 12/71* (2011.01)
*H01R 12/72* (2011.01)
*H04N 5/38* (2006.01)
*H04N 5/44* (2011.01)

(52) U.S. Cl.
CPC .............. *H04N 7/22* (2013.01); *G02B 6/3897* (2013.01); *G02B 6/4246* (2013.01); *G02B 6/4292* (2013.01); *H01R 12/716* (2013.01); *H01R 12/721* (2013.01); *H04B 10/25891* (2020.05); *H04N 5/38* (2013.01); *H04N 5/44* (2013.01)

(58) Field of Classification Search
CPC combination set(s) only.
See application file for complete search history.

(56) References Cited

U.S. PATENT DOCUMENTS

| | | | |
|---|---|---|---|
| 6,758,693 B2 * | 7/2004 | Inagaki ............... | G02B 6/4292 385/94 |
| 7,065,604 B2 * | 6/2006 | Konda ................. | H04N 7/22 710/72 |
| 7,215,554 B2 * | 5/2007 | Torres ................ | H01R 13/6582 361/740 |
| 7,307,847 B2 * | 12/2007 | Torres ................ | G02B 6/4292 361/740 |

(Continued)

*Primary Examiner* — Agustin Bello
(74) *Attorney, Agent, or Firm* — Chen Yoshimura LLP

(57) ABSTRACT

In a video signal transmission system using fiber optic cable, an improved optical transceiver module (fiber module) having integrated video signal processing capabilities can be used in video signal transmitters for video sources, video signal receivers for display devices, or video switching devices. The improved fiber module has a form factor complying with the Small Form-factor Pluggable standard, and a standard optical fiber connector. In addition to an optical transceiver, the improved fiber modules includes a ¼ inch signal processing chip programmed to perform video signal processing. The mainboard of the video signal transmitter or receiver or the video switching device has additional signal processing chips for processing non-video signals such as audio, data, network, RS-232, and IR remote control signals, but they do not perform video signal processing. Another embodiment is a fiber optic cable with an electrical signal connector module that integrates a video signal processing chip.

19 Claims, 5 Drawing Sheets

(56) References Cited

U.S. PATENT DOCUMENTS

| | | | | |
|---|---|---|---|---|
| 7,331,819 B2* | 2/2008 | Nelson | G02B 6/4274 | 439/577 |
| 7,401,985 B2* | 7/2008 | Aronson | G02B 6/4292 | 385/89 |
| 7,860,398 B2* | 12/2010 | Tatum | G09G 5/006 | 398/139 |
| 8,244,124 B2* | 8/2012 | Nguyen | G02B 6/4284 | 385/79 |
| 9,052,482 B1* | 6/2015 | Siddhaye | G02B 6/4293 | |
| 9,134,493 B2* | 9/2015 | Tong | G02B 6/4284 | |
| 9,176,290 B2* | 11/2015 | Benton | G02B 6/4284 | |
| 9,250,405 B2* | 2/2016 | Tong | G02B 6/4242 | |
| 9,544,058 B2* | 1/2017 | Coffey | G02B 6/3895 | |
| 9,568,681 B2* | 2/2017 | Roussel | H01R 13/6275 | |
| 9,658,419 B2* | 5/2017 | Fankhauser | G02B 6/4453 | |
| 9,686,598 B2* | 6/2017 | Siddhaye | H04B 10/808 | |
| 9,979,479 B2* | 5/2018 | Parekh | G02B 6/4246 | |
| 10,241,283 B1 | 3/2019 | Shen | | |
| 10,247,893 B1* | 4/2019 | Elkayam | H01R 25/003 | |
| 10,347,960 B2* | 7/2019 | Kikuchi | H01R 24/28 | |
| 10,483,707 B2* | 11/2019 | Torres | H01R 13/46 | |
| 10,796,824 B2* | 10/2020 | Kim | G06F 1/266 | |
| 11,201,422 B2* | 12/2021 | Lu | H01R 13/6675 | |
| 11,239,911 B2* | 2/2022 | Jung | H04B 10/07955 | |
| 2002/0044746 A1* | 4/2002 | Kronlund | H04B 10/25891 | 385/101 |
| 2003/0016920 A1* | 1/2003 | Sohmura | G02B 6/4292 | 385/88 |
| 2005/0041407 A1* | 2/2005 | Torres | H01R 13/6582 | 361/797 |
| 2006/0083518 A1* | 4/2006 | Lee | G09G 3/2096 | 386/E5.07 |
| 2006/0088251 A1* | 4/2006 | Wang | G02B 6/4201 | 385/101 |
| 2009/0196621 A1* | 8/2009 | Chen | G06F 13/4027 | 398/115 |
| 2010/0278539 A1* | 11/2010 | Kasbeer-Betty | G02B 6/4284 | 398/135 |
| 2011/0249408 A1* | 10/2011 | Lavoie | H03G 3/3042 | 361/728 |
| 2011/0262147 A1* | 10/2011 | Lavoie | H04B 10/40 | 398/135 |
| 2012/0170890 A1* | 7/2012 | Benton | G02B 6/4261 | 385/31 |
| 2012/0249871 A1* | 10/2012 | Nguyen | H04N 7/102 | 348/E7.003 |
| 2012/0257103 A1* | 10/2012 | Lavoie | H04N 11/24 | 348/E7.003 |
| 2012/0308180 A1* | 12/2012 | Tosetti | G02B 6/3878 | 385/27 |
| 2012/0314778 A1* | 12/2012 | Salustri | H04N 21/4348 | 375/E7.189 |
| 2013/0046916 A1* | 2/2013 | Dudemaine | H04N 7/22 | 710/317 |
| 2013/0077968 A1* | 3/2013 | Yang | H04B 10/40 | 398/45 |
| 2013/0236144 A1* | 9/2013 | Tong | G02B 6/4401 | 385/102 |
| 2013/0243438 A1* | 9/2013 | Tang | H04B 10/40 | 398/135 |
| 2015/0215589 A1* | 7/2015 | Pescod | H04B 10/25891 | 348/211.1 |
| 2015/0288455 A1* | 10/2015 | Légaré-Vallée | H04B 10/671 | 398/201 |
| 2015/0378118 A1* | 12/2015 | Huegerich | G02B 6/3817 | 385/89 |
| 2016/0050029 A1* | 2/2016 | Huegerich | H04B 10/808 | 398/116 |
| 2016/0299300 A1* | 10/2016 | Lavoie | G02B 6/4261 |  |
| 2017/0075849 A1* | 3/2017 | Lavoie | G06F 13/4081 |  |
| 2018/0009072 A1* | 1/2018 | Kittel | B23P 15/26 |  |
| 2018/0054646 A1* | 2/2018 | Lavoie | H04N 21/4183 |  |
| 2018/0372963 A1* | 12/2018 | Bar-Hai | G02B 6/42 |  |
| 2019/0278037 A1* | 9/2019 | Leigh | H01R 12/7005 |  |
| 2019/0356090 A1* | 11/2019 | Lei | H01R 13/582 |  |
| 2020/0288589 A1* | 9/2020 | Lavoie | H05K 7/20163 |  |
| 2021/0036780 A1* | 2/2021 | Kuo | G02B 6/4284 |  |
| 2021/0257785 A1* | 8/2021 | Shah | H01R 12/72 |  |
| 2021/0392300 A1* | 12/2021 | Tong | H04B 10/25891 |  |
| 2021/0392301 A1* | 12/2021 | Tong | H04N 21/42615 |  |

* cited by examiner

TRANSMITTERS AND RECEIVERS FOR TRANSMISSION OF VIDEO AND OTHER SIGNALS BY FIBER OPTIC CABLE

BACKGROUND OF THE INVENTION

Field of the Invention

This invention relates to transmission of video and other signals by fiber optic cables, and in particular, it relates to transmitters and receivers used in transmission of video and other signals by fiber optic cables.

Description of Related Art

Fiber optic cables are widely used to transmit video, audio and other signal between video sources (such as video players, video signal switches, computers, etc.) and display devices (such as digital televisions, monitors, etc.). In addition to video signals, the signals transmitted between the video sources and display devices often include audio signals, data signals (such as USB (Universal Serial Bus) format data signals for peripheral devices), etc. The video signal typically complies with an industry-standard video transmission format such as HDMI (High Definition Multimedia Interface), DP (DisplayPort), DVI (Digital Visual Interface), VGA (Video Graphics Array), etc.

Some fiber optic transmitters and receivers, for example some such devices used in data centers, typical employ optical transceiver modules (referred to as fiber modules) that function to convert signals between optical signals and electrical signals. SFP (Small Form-factor Pluggable) fiber modules are a category of industry-standard, compact and hot-pluggable optical transceivers for such use. SFP fiber modules typically employ an industry-standard optical ribbon fiber connector for connecting to fiber optic cables, such as MPO (Multi-fiber Push On) connectors.

SUMMARY

The present invention is directed to an improved SFP fiber module that incorporates video signal processing functions, signal transmitters and receivers employing such improved fiber modules, video switches employing such improved fiber modules, and fiber optic cable device with integrated optical transceiver and video signal processing chip.

An object of the present invention is to provide an improved SFP fiber module that incorporates video signal processing functions so that the corresponding signal transmitter and signal receiver mainboards do not need to perform video signal processing.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a fiber module which includes: a top cover and a bottom cover assembled together, which define an exterior shape of the fiber module having a size no greater than 75 mm by 20 mm by 15 mm; a circuit board disposed between the top and bottom covers; an optical fiber connector connected to the circuit board and disposed between the top and bottom covers; an optical transceiver mounted on the circuit board and coupled to the optical fiber connector, configured to convert electrical signals to optical signals and to convert optical signals to electrical signals; a video signal processing chip mounted on the circuit board and coupled to the optical transceiver, and programmed to perform video signal processing; and a plurality of electrical signal pins formed on the circuit board and coupled to the video signal processing chip to transmit video signal and non-video signals.

In some embodiments, the exterior shape of the fiber module and the plurality of electrical signal pins comply with a SFP (Small Form-factor Pluggable) standard.

In some embodiments, the optical ribbon fiber connector is an MPO (Multi-fiber Push On) connector.

In some embodiments, the video signal processing chip has a size of ¼ inch by ¼ inch.

In some embodiments, the video signal processing chip is programmed to perform video signal processing in compliance with a video transmission format selected from a group consisting of HDMI (High Definition Multimedia Interface), DP (DisplayPort), DVI (Digital Visual Interface). More specifically, the video signal processing chip is programmed to perform video signal processing in compliance with HDMI video transmission format, including processing of SCL ($I^2C$ serial clock for DDC (Display Data Channel)), SDA ($I^2C$ serial data for DDC), CEC (Consumer Electronics Control), HPD (Hot Plug Detect), and ARC (Audio Return Channel) signals, or the video signal processing chip is programmed to perform video signal processing in compliance with DVI video transmission format, including processing of DDC and HPD signals, or the video signal processing chip is programmed to perform video signal processing in compliance with DP (DisplayPort) video transmission format, including processing of AUX and HPD signals.

In some embodiments, the video signal processing chip is further programmed to control the optical transceiver.

In another aspect, the present invention provides a video signal transmission device employing the above fiber module, the video signal transmission device further including: a main circuit board, wherein the fiber module is electrically coupled to the main circuit board; a plurality of external electrical signal connectors mounted on the main circuit board; and one or more additional signal processing chips mounted on the main circuit board and electrically coupled to the plurality of external electrical signal connectors and the fiber module, wherein the additional signal processing chips are programmed to perform signal processing for a plurality of non-video signals.

In some embodiments, the plurality of non-video signals include one or more signals selected from a group consisting of audio signals, data signals for a peripheral device, network signals, RS-232 signals, and IR remote control signals.

In some embodiments, the plurality of external electrical signal connectors include one or more connectors selected from a group consisting of USB (Universal Serial Bus) connectors, Ethernet connectors, and RS-232 connectors.

In some embodiments, the video signal transmission device further includes a fiber module mounting frame mounted on the main circuit board, the fiber module mounting frame having a size and a shape configured to accommodate the fiber module, wherein the fiber module is configured to be plugged into and unplugged from the fiber module mounting frame.

In another aspect, the present invention provides a video switching device employing a plurality of the above fiber modules, the video switching device further including: a video matrix switch, wherein the plurality of the fiber modules are coupled to the video matrix switch; a plurality of video source connectors coupled to the video matrix switch, wherein the video matrix switch is configured to selectively couple each video source connector to one or more of the plurality of fiber modules; and one or more additional signal processing chips electrically coupled to the plurality of video source connectors and the plurality of fiber modules, wherein the additional signal processing chips are programmed to perform signal processing for a plurality of non-video signals.

In another aspect, the present invention provides a video signal transmission device, which includes: a main circuit board; a plurality of external electrical signal connectors mounted on the main circuit board; one or more signal processing chips mounted on the main circuit board and coupled to the plurality of external electrical signal connectors, wherein the signal processing chips are programmed to perform signal processing for a plurality of non-video signals; and a fiber module mounted on the main circuit board, the fiber module including a casing having a size no greater than 75 mm by 20 mm by 15 mm, and an optical fiber connector, an optical transceiver and a video signal processing chip disposed in the casing and coupled to each other, wherein the video signal processing chip is programmed to perform video signal processing.

In another aspect, the present invention provides a fiber optic cable device, which includes: a cable containing a plurality of optical fibers; an optical fiber connector connected at one end of the cable; and an electrical signal connector module connected at another end of the cable, the electrical signal connector module including: a casing having a size no greater than 75 mm by 20 mm by 15 mm, a first end of the casing being connected to the cable; an optical transceiver disposed within the casing and coupled to the plurality of optical fibers; a video signal processing chip disposed within the casing and coupled to the optical transceiver, and programmed to perform video signal processing; and an electrical signal connector coupled to the video signal processing chip and protruding from a second end of the casing.

In some embodiments, the optical fiber connector of the fiber optic cable device is an MPO (Multi-fiber Push On) connector, and the electrical signal connector complies with a video transmission format selected from a group consisting of HDMI (High Definition Multimedia Interface), DP (DisplayPort), and DVI (Digital Visual Interface).

In some embodiments, the video signal processing chip of the fiber optic cable device has a size of ¼ inch by ¼ inch and is programmed to perform video signal processing in compliance with a video transmission format selected from a group consisting of HDMI (High Definition Multimedia Interface), DP (DisplayPort), and DVI (Digital Visual Interface).

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
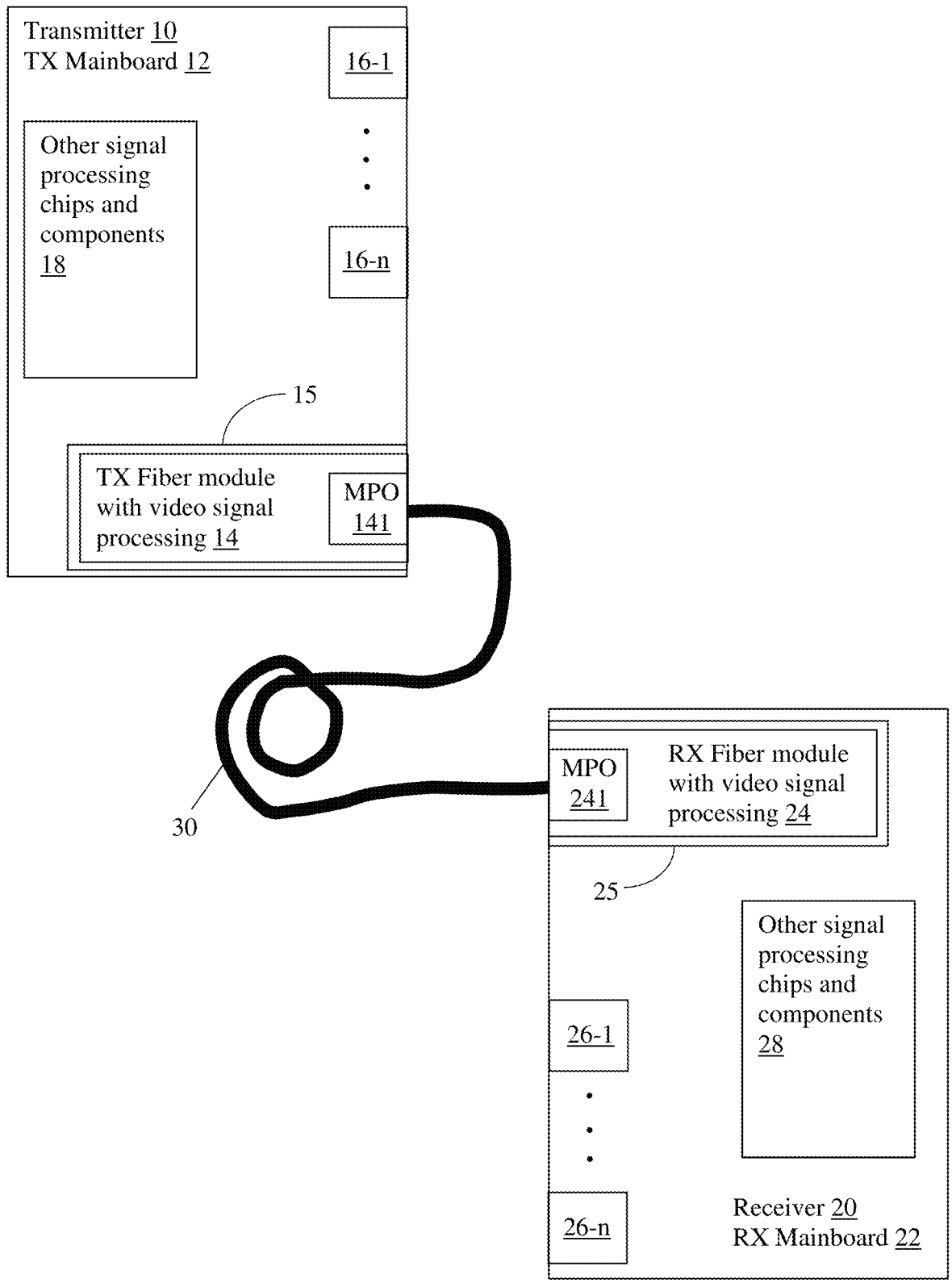
FIG. 1 schematically illustrates a signal transmission system including a signal transmitter for a video source and a signal receiver for a display device connected by a fiber optic cable according to an embodiment of the present invention.

FIG. 1 schematically illustrates a signal transmission system for video and other signals according to an embodiment of the present invention. The system includes a signal transmitter 10 adapted to be installed in or connected to a video source, and a signal receiver 20 adapted to be installed in or connected to a display device, the signal transmitter and signal receiver being connected to each other by a fiber optic cable 30. The video source (not shown) may be, for example, a video player, a computer, a video signal switch, etc.; the display device (not shown) may be, for example, a digital TV, a computer monitor, a flat panel display, a projector, etc. Note that although the device 10 at the video source end is referred to as a signal transmitter and the device 20 at the display device end is referred to as a signal receiver, signal transmission between them is bi-directional. The fiber optic cable 30 is preferably equipped with standard optical ribbon fiber connectors such as MPO connectors at both ends.

The signals transmitted over the fiber optic cable 30 between the transmitter 10 and receiver 20 may include multimedia video signals, audio signals, data signals (such as USB-format signals for data related to keyboard, mouse, thumb drive, hard drive, computer camera, and/or other peripheral devices), network signals (data signals communicated to or from the video source or display device over a network such as Ethernet), RS-232 signals (data signals communicated to or from the video source or display device over an RS-232 cable), IR remote control signals (electrical signals generated by or for an infrared-based remote control component of the video source or the display device), etc. In many embodiments, the fiber optic cable 30 transmit these signals between the transmitter 10 and receiver 20 over a long distance such as 100 ft to 1000 ft or even longer, with a high bandwidth e.g. over 40 Gbps, thus enabling multi-function extension of the transmission capability using fiber optic links. The transmitter 10 and receiver 20 are not linked by any other cables, and all signals are transmitted over the fiber optic cable 30.

The signal transmitter 10 has a main circuit board (transmitter mainboard) 12 on which various components are mounted, including a transmitter fiber module 14 with a standard optical fiber connector 141 for connecting with the fiber optic cable 30, multiple external electrical signal connectors 16-1 to 16-n (such as USB, Ethernet, RS-232, etc. connectors), and various other components 18 including signal processing chips and other components for various supporting functions, electrically coupled to each other. Similarly, the signal receiver 20 has a main circuit board (receiver mainboard) 22 on which various components are mounted, including a receiver fiber module 24 with a standard optical fiber connector 241 for connecting with the fiber optic cable 30, multiple external electrical signal connectors 26-1 to 26-*n* (such as USB, Ethernet, RS-232, etc. connectors), and various other components 28 including signal processing chips and other components for various supporting functions, electrically coupled to each other. The mainboards 12 and 22 may be, for example, printed circuit bards (PCBs).

Each of the transmitter fiber module 14 and receiver fiber module 24 has a form factor that complies with the requirements of the SFP (Small Form-factor Pluggable) standard for fiber modules so that it can be plugged into or unplugged from the respective mainboards 12 and 22. Unlike conventional SFP fiber modules, however, each of the transmitter fiber module 14 and receiver fiber module 24 includes a signal processing chip that performs video signal processing functions. In conventional transmitters and receivers adapted for video sources and display devices, all electrical signal processing functions for video, audio and data signals are performed by chips mounted on the mainboard. A conventional fiber module, which has an optical transceiver (including light emitting devices, e.g. laser diodes, and light detecting devices, e.g. photodiodes) configured to perform electrical-to-optical and optical-to-electrical signal conversions, only performs electrical signal processing related to control of the optical transceiver, and is not capable of performing video signal processing.

In embodiments of the present invention, the transmitter fiber module 14 and the receiver fiber module 24 perform the following video signal processing functions: for HDMI, processing of SCL (I²C serial clock for DDC (Display Data Channel)), SDA (I²C serial data for DDC), CEC (Consumer Electronics Control), HPD (Hot Plug Detect), and ARC (Audio Return Channel) signals; for DVI, processing of DDC and HPD signals; for DisplayPort, processing of AUX (Auxiliary channel) and HPD signals. The transmitter and receiver mainboards 12 and 22 do not have signal processing chips that perform any of the video signal processing functions listed above, and merely route the video signals for the transmitter fiber module 14 and receiver fiber module 24, respectively. On the other hand, the transmitter fiber module 14 and receiver fiber module 24 do not perform any electrical signal processing functions for the non-video signals such as audio, USB data, network, RS-232, IR remote control, etc. signals; these non-video signals are processed by other signal processing chips on the mainboards, and the transmitter and receiver fiber modules only performs electrical-optical signal conversion for them. Noted here that "audio signal" refers to audio signals that are separate from the multimedia video signal which itself may contain audio; here, the audio signal may be signals from a computer's microphone, for example.

This separation of the location of video signal processing from non-video signal processing allows the same transmitter fiber module 14 (or receiver fiber module 24) to be alternatively plugged into different transmitter mainboards 12 (or receiver mainboards 22), or different transmitter fiber modules (or receiver fiber modules) to be alternatively plugged into the same transmitter mainboard (or receiver mainboard), to accomplish desired combinations of signal processing functions to suit different applications. For example, each transmitter fiber module 14 and receiver fiber module 24 is preferably designed to perform video signal processing required for one particular video transmission standard, such as HDMI, DP, DVI, etc.; suitable transmitter and receiver fiber modules may be chosen for a particular system depending on the transmission format of the video signal. As another example, different transmitter and receiver mainboards may be equipped with different non-video signal processing functions (for example, if USB signal processing is not needed for the system, the mainboards may omit related signal processing components to reduce cost); suitable mainboards may be chosen to be used with the transmitter and receiver fiber modules depending on the system and application need. These various combinations are possible because different transmitter fiber modules 14 and receiver fiber modules 24 have the same standard form factor, and different transmitter mainboards 12 and receiver mainboards 22 have the same standard slots that accommodate the transmitter and receiver fiber modules. Further, transmitter fiber modules and receiver fiber modules may even be employed alone, without the mainboards, for video-only applications.

Figure 2:
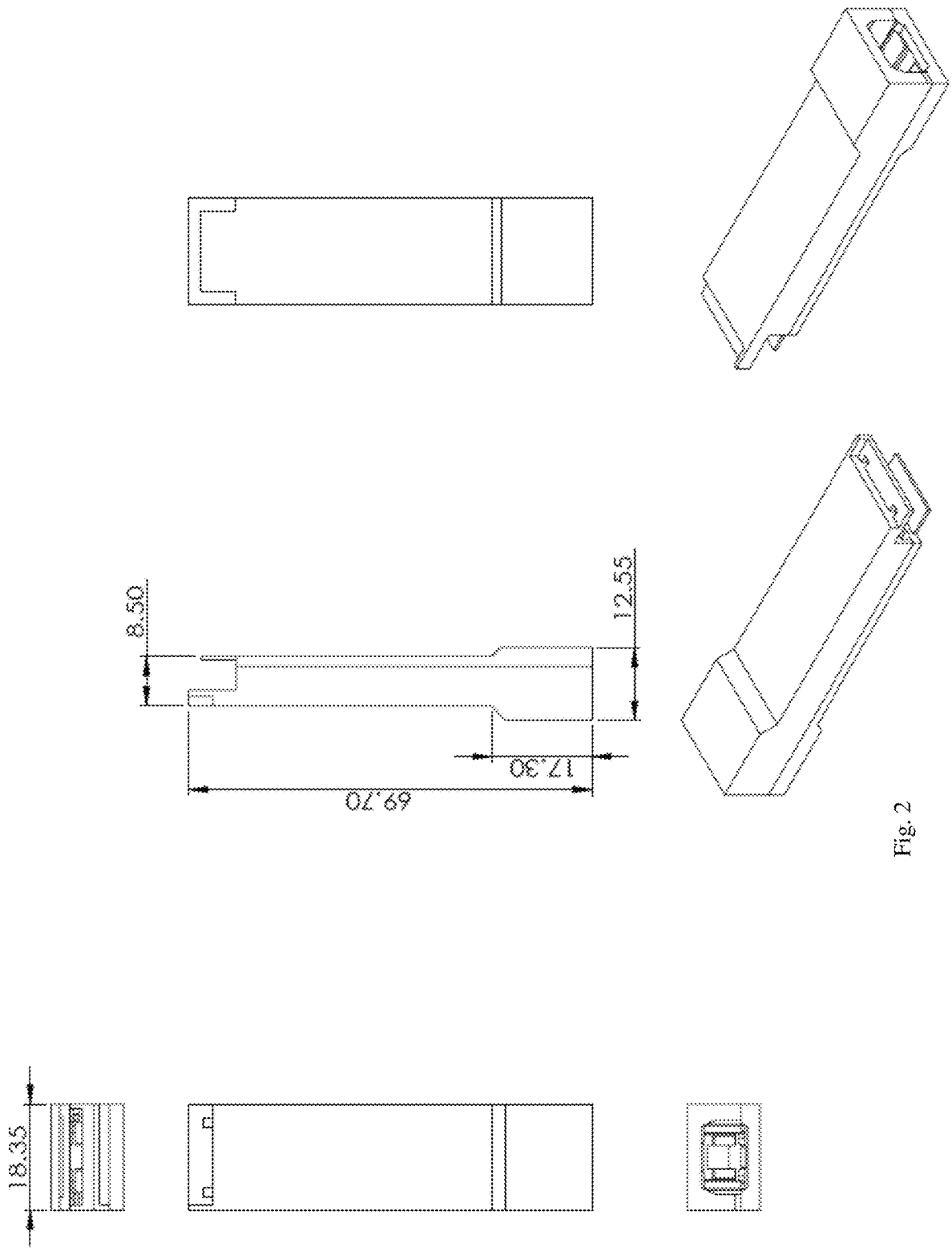
FIG. 2 shows side and perspective views of a transmitter fiber module or receiver fiber module with video signal processing functions according to embodiments of the present invention.
Figure 3:
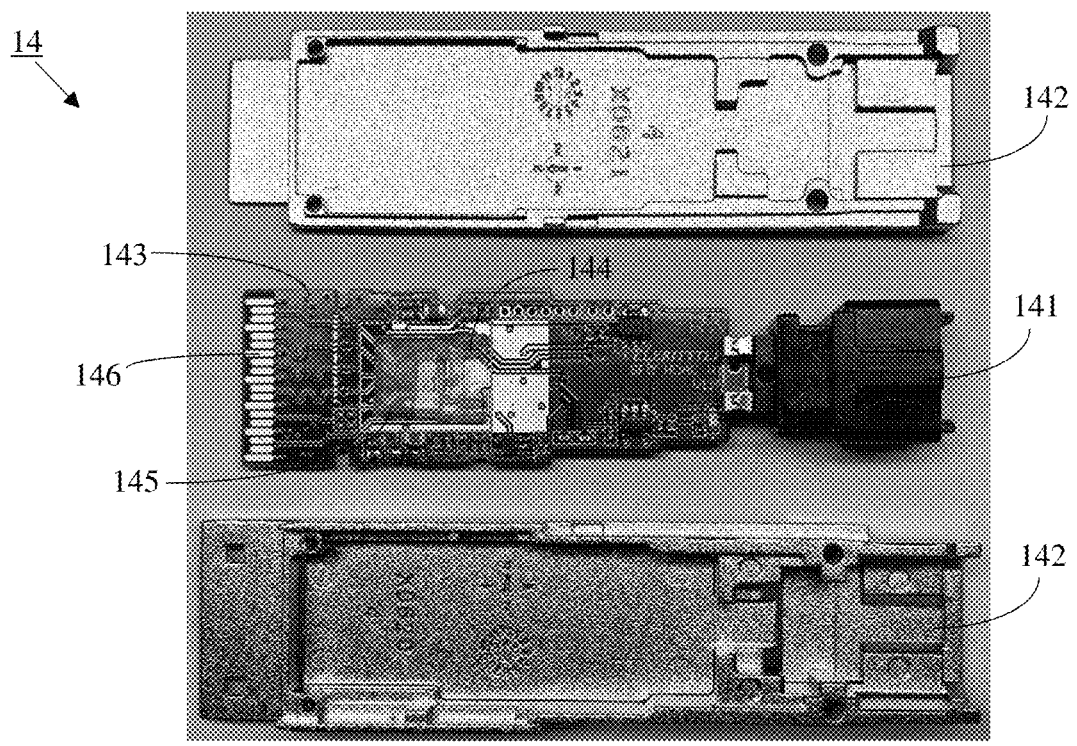
FIG. 3 show the structure of the transmitter fiber module or receiver fiber module with video signal processing functions according to embodiments of the present invention.

The transmitter fiber module 14 and receiver fiber module 24 have the same structure except for their video signal processing functions. The descriptions below, with reference to FIGS. 2 and 3, apply to both transmitter and receiver fiber modules (simply referred to as the fiber module). FIG. 2 shows various exterior side views and perspective views of the fiber module, and FIG. 3 shows an unassembled fiber module. As shown in FIG. 2, the fiber module has an exterior shape that approximates an elongated rectangular box (slightly thicker at the front end), where the two smaller dimensions define the front end face of the fiber module that accommodates a standard optical fiber connector, for example, an MPO connector for a specified number of optical fibers. Preferably, the fiber module has an external form factor that complies with the requirements of the SFP standard. In one specific example, as shown in FIG. 2, the fiber module has a size of approximately 69.70 mm by 18.35 mm by 12.55 mm. More generally, the fiber module has a size smaller than 75 mm by 20 mm by 15 mm.

As shown in FIG. 3, the fiber module 14 has top and bottom covers 142 (e.g. metal covers) which, when assembled together, forms a casing having the form factor described above. A circuit board 143 and an optical fiber connector 141 connected to the circuit board are disposed between the covers when assembled. The optical fiber connector 141 is preferably a standard connector, such as an MPO connector, which can accommodate multi-fiber cables and is equipped with a snap to retain the cable. Other optical fiber connectors may also be used. An optical transceiver 144 and a signal processing chip 145 are mounted on the circuit board 143. The optical transceiver 144, which is coupled to the optical fiber connector 141 and the signal processing chip 145, has light emitting devices (e.g. laser diodes) and light detecting devices (e.g. photodiodes) configured to perform electrical-to-optical and optical-to-electrical signal conversions, respectively. A plurality of electrical signal pins 146 are formed at the back end of the circuit board 143 and are exposed by the covers when assembled. The physical locations and the number of pins 146 comply with the SFP fiber module standard, but the signals transmitted by the pins are different from those in conventional fiber modules. The signal processing chip 145 is programmed to carry out the above-described video processing functions. The chip 145 is also programmed to perform control functions to control the optical transceiver. In a preferred embodiment, the signal processing chip 145 is a ¼ inch by ¼ inch sized chip. The signal processing chips in the transmitter fiber module and receiver fiber module are programmed to perform different video signal processing functions as noted earlier.

Referring back to FIG. 1, in the signal transmitter 10, a fiber module mounting frame 15 is mounted on the transmitter mainboard 12, and is sized and shaped to accommodate the fiber module 14 plugged into it. A number of pins are located in the fiber module mounting frame 15 and coupled to the mainboard 12, and configured to form electrical connections with the electrical signal pins 146 at the back end of the fiber module 14 to couple electrical signals between the mainboard and the fiber module. Suitable mechanical structures such as snaps are provided in the fiber module mounting frame 15 to securely retain the fiber module 14 within the mounting frame, while allowing the fiber module to be easily unlocked and removed from the frame. This way, the fiber module 14 can be easily plugged into and unplugged from the signal transmitter 10, which enhances service flexibility.

Similarly, the signal receiver 20 has a fiber module mounting frame 25 mounted on the receiver mainboard 22 to accommodate the receiver fiber module 24. Note that because the fiber modules 14 and 24 have a form factor, including the pin number and locations, that complies with industry standards for fiber modules, the fiber module mounting frames 15 and 25 may have the same structure as those used with conventional fiber modules.

In use, the signal transmitter 10 is installed in or connected to a video source, and the signal receiver 20 is installed in or connected to a display device. The transmitter fiber module 14 is plugged into the signal transmitter 10, and the receiver fiber module 24 is plugged into the signal receiver 20. The fiber optic cable 30 is routed through the desired space (e.g., from one room to another) and plugged into the transmitter fiber module 14 and the receiver fiber module 24.

As noted earlier, although the device 10 at the video source end is referred to as a signal transmitter and the device 20 at the display device end is referred to as a signal receiver, signal transmission between them is bi-directional. They may have generally similar structures in terms of the external electrical signal connectors and various support components, although their signal processing chips are programmed to perform different functions. Therefore, both the signal transmitter 10 and signal receiver 20 may be more generally referred to as signal transmission devices, where their respective fiber modules may be more generally referred to as fiber modules.

Figure 4:
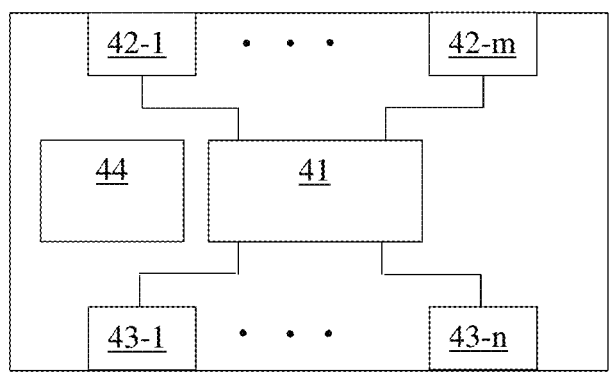
FIG. 4 schematically illustrates a video switch employing the transmitter fiber module according to another embodiment of the present invention.

FIG. 4 schematically illustrates a video switching device employing fiber modules with video processing functions, according to another embodiment of the present invention. The video switching device 40 includes a video matrix switch 41, such as a 4×4 or an 8×8 matrix switch, connected to multiple (e.g. 4 or 8) video source connectors 42-1 to 42-m, each adapted to be connected to a video source, and multiple (e.g. 4 or 8) display device connectors 43-1 to 43-n, each adapted to be connected to a display device. The video matrix switch 41 selectively couples each video source connector to one or more display device connectors. The video switching device 40 further includes various signal processing chips 44 and other components (not shown). The video switching device 40 may include other external electrical signal connectors, such as USB, RS-232, etc. connectors (not shown).

Each of the display device connectors 43-1 to 43-n has the same structure as the transmitter fiber module 14 described earlier. That is, each display device connector includes a signal processing chip configured to perform video signal processing, an optical transceiver, and a standard optical fiber connector, all disposed between two covers that define a form factor complying with the requirements of the SFP standard for fiber modules. The video switching device 40 does not have any other components that perform video signal processing functions. The signal processing chips 44 of the video switching device 40 only performs signal processing functions for non-video signals.

In some embodiments, multiple fiber module mounting frames, similar to the fiber module mounting frame 15 described earlier, may be provided on a circuit board of the video switching device 40 to accommodate corresponding display device connectors (transmitter fiber modules). Thus, different display device connectors with different video processing functions (e.g. for different video transmission standards) may be plugged into and unplugged from the video switching device 40.

The video switching device 40 may be used, for example, to output multiple video signals to a large display system formed of multiple flat panel displays, or to multiple monitors at different locations for a video conference, etc.

Figure 5:
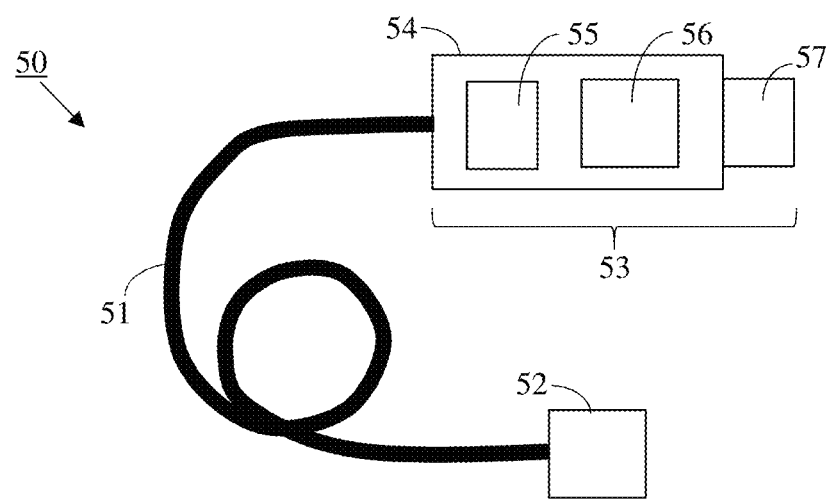
FIG. 5 schematically illustrates a fiber optic cable device with integrated optical transceiver and video signal processing chip according to another embodiment of the present invention.

FIG. 5 schematically illustrates a fiber optic cable device 50 with integrated optical transceiver and video signal processing chip according to another embodiment of the present invention. The fiber optic cable device 50 includes a cable 51 containing a plurality of optical fibers, with an optical fiber connector 52 at one end and an electrical signal connector module 53 at the other end. The optical fiber connector 52 is preferably a standard optical ribbon fiber connector, such as an MPO connector.

The electrical signal connector module 53 includes, within a casing 54, an optical transceiver 55 and a signal processing chip 56 mounted on a circuit board. The optical transceiver 55 and signal processing chip 56 have similar structures and functions as the optical transceiver 144 and signal processing chip 145 of the fiber module 14 described earlier. In particular, the signal processing chip 56 is preferably a ¼ inch by ¼ inch chip programmed to perform video signal processing functions described above for the signal processing chip 145. The size of the casing 54 is no greater than 10 mm by 20 mm by 45 mm. The electrical signal connector module 53 further includes an electrical signal connector 57 that protrudes from the casing 54, which preferably complies with a video transmission standard such as HDMI, DP, DVI, etc.

Figure 6:
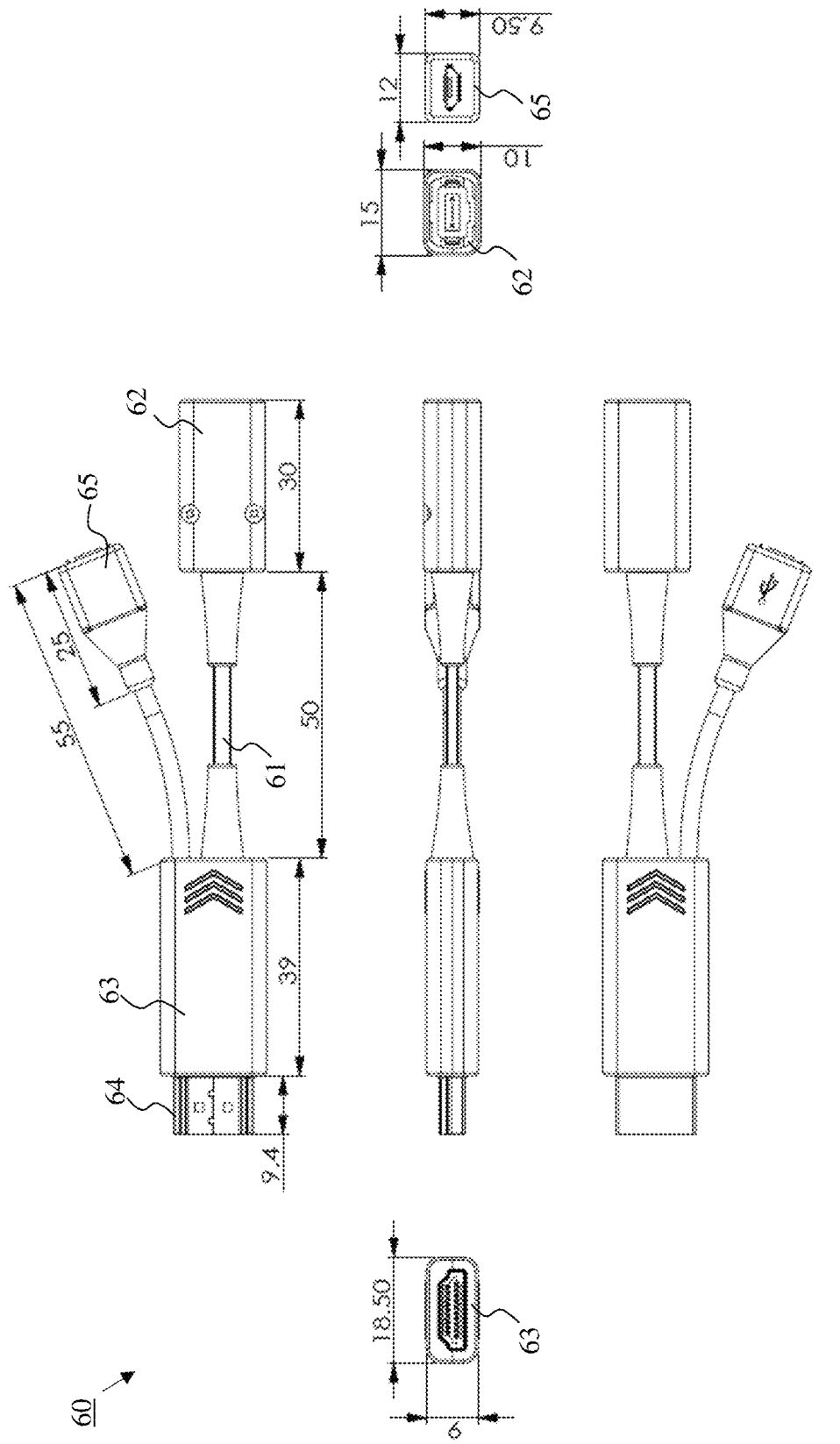
FIG. 6 schematically illustrates a fiber optic cable adapter with integrated optical transceiver and video signal processing chip according to another embodiment of the present invention.

FIG. 6 schematically illustrates a fiber optic cable adapter 60 with integrated optical transceiver and video signal processing chip according to another embodiment of the present invention. The fiber optic cable adapter 60 includes short cable 61 containing a plurality of optical fibers, with an optical fiber connector 62 at one end and an electrical signal connector module 63 at the other end. The optical fiber connector 62 is preferably a standard optical ribbon fiber connector, such as an MPO connector.

The electrical signal connector module 63 has a structure similar to that of the electrical signal connector module 53 described earlier (the internal structure of the electrical signal connector module 63 is not illustrated in FIG. 6). That is, the electrical signal connector module 63 includes, within a casing, an optical transceiver and a signal processing chip mounted on a circuit board. The optical transceiver and signal processing chip have similar structures and functions as the optical transceiver 144 and signal processing chip 145 of the fiber module 14 described earlier. In particular, the signal processing chip is preferably a ¼ inch by ¼ inch chip programmed to perform video signal processing functions described above for the signal processing chip 145. The size of the casing of the electrical signal connector module 63 is no greater than 10 mm by 20 mm by 45 mm. In the illustrated embodiment, the size of the casing is 9 mm by 18.5 mm by 39 mm. The electrical signal connector module 63 further includes an electrical signal connector 64 that protrudes from the casing, which preferably complies with a video transmission standard such as HDMI, DP, DVI, etc.

A USB connector 65 is also connected to the electrical signal connector module 63, located at the same end of the module as the cable 61. The USB connector 65 is coupled to the internal circuitry of the electrical signal connector module 63, including the signal processing chip and/or the electrical signal connector. The USB port may have the following functions: First, to supply power to the electrical signal connector module 63; and second, to provide data transfer for keyboard, mouse, touch screen, and/or UART (universal asynchronous receiver-transmitter) data between a computer (e.g. a server) and a display device (e.g. a monitor).

To summarize, various embodiments of the present invention have a common feature where a module smaller than 75 mm by 20 mm by 15 mm integrates a standard optical fiber connector or video signal connector, an optical transceiver, and a signal processing chip programmed to perform video signal processing functions including processing the SCL, SDA, CEC, HPD and ARC signals for HDMI, processing the DDC and HPD signals for DVI, and processing the AUX and HPD signals for DisplayPort. Such a module may have the form factor of a conventional fiber module with a standard optical fiber connector and be used as a part of a signal transmitter or signal receiver or a video switch, providing greater service flexibility. Such a module may also form a part of a fiber optic cable device with a standard video signal connector.

It will be apparent to those skilled in the art that various modification and variations can be made in the fiber modules incorporating video processing functions, and related signal transmitter, signal receiver, video switch, and fiber optic cable device of the present invention without departing from the spirit or scope of the invention. Thus, it is intended that the present invention cover modifications and variations that come within the scope of the appended claims and their equivalents.

What is claimed is:

1. A fiber module comprising:
a top cover and a bottom cover assembled together, which define an exterior shape of the fiber module having a size no greater than 75 mm by 20 mm by 15 mm;
a circuit board disposed between the top and bottom covers;
an optical fiber connector connected to the circuit board and disposed between the top and bottom covers;
an optical transceiver mounted on the circuit board and coupled to the optical fiber connector, configured to convert electrical signals to optical signals and to convert optical signals to electrical signals;
a video signal processing chip mounted on the circuit board and contained between the top and bottom covers, coupled to the optical transceiver, and programmed to perform video signal processing in compliance with a video transmission format selected from a group consisting of HDMI (High Definition Multimedia Interface), DP (DisplayPort), and DVI (Digital Visual Interface), including one or more of:
for HDMI video signals, processing of SCL ($I^2C$ serial clock for DDC (Display Data Channel)), SDA ($I^2C$ serial data for DDC), CEC (Consumer Electronics Control), HPD (Hot Plug Detect), and ARC (Audio Return Channel) signals,
for DVI video signals, processing of DDC and HPD signals, and
for DisplayPort video signals, processing of AUX (Auxiliary channel) and HPD signals; and
a plurality of electrical signal pins formed on the circuit board and coupled to the video signal processing chip to transmit video signal and non-video signals.

2. The fiber module of claim 1, wherein the exterior shape of the fiber module and the plurality of electrical signal pins comply with a SFP (Small Form-factor Pluggable) standard.

3. The fiber module of claim 1, wherein the optical ribbon fiber connector is an MPO (Multi-fiber Push On) connector.

4. The fiber module of claim 1, wherein the video signal processing chip has a size of ¼ inch by ¼ inch.

5. The fiber module of claim 1, wherein the video signal processing chip is further programmed to control the optical transceiver.

6. A video signal transmission device comprising the fiber module of claim 1, the video signal transmission device further comprising:
a main circuit board, wherein the fiber module is electrically coupled to the main circuit board;
a plurality of external electrical signal connectors mounted on the main circuit board; and
one or more additional signal processing chips mounted on the main circuit board and electrically coupled to the plurality of external electrical signal connectors and the fiber module, wherein the additional signal processing chips are programmed to perform signal processing for a plurality of non-video signals.

7. The video signal transmission device of claim 6, wherein the plurality of non-video signals include one or more signals selected from a group consisting of audio signals, data signals for a peripheral device, network signals, RS-232 signals, and IR remote control signals.

8. The video signal transmission device of claim 6, wherein the plurality of external electrical signal connectors include one or more connectors selected from a group consisting of USB (Universal Serial Bus) connectors, Ethernet connectors, and RS-232 connectors.

9. The video signal transmission device of claim 6, further comprising a fiber module mounting frame mounted on the main circuit board, the fiber module mounting frame having a size and a shape configured to accommodate the fiber module, wherein the fiber module is configured to be plugged into and unplugged from the fiber module mounting frame.

10. A video switching device comprising a plurality of the fiber modules of claim 1, the video switching device further comprising:
a video matrix switch, wherein the plurality of the fiber modules are coupled to the video matrix switch;
a plurality of video source connectors coupled to the video matrix switch,
wherein the video matrix switch is configured to selectively couple each video source connector to one or more of the plurality of fiber modules; and
one or more additional signal processing chips electrically coupled to the plurality of video source connectors and the plurality of fiber modules, wherein the additional signal processing chips are programmed to perform signal processing for a plurality of non-video signals.

11. A video signal transmission device, comprising:
a main circuit board;
a plurality of external electrical signal connectors mounted on the main circuit board;
one or more signal processing chips mounted on the main circuit board and coupled to the plurality of external electrical signal connectors, wherein the signal processing chips are programmed to perform signal processing for a plurality of non-video signals; and
a fiber module mounted on the main circuit board, the fiber module including a casing having a size no greater than 75 mm by 20 mm by 15 mm, and an optical fiber connector, an optical transceiver and a video signal processing chip disposed in the casing and coupled to each other, wherein the video signal processing chip is programmed to perform video signal processing in compliance with a video transmission format selected from a group consisting of HDMI (High Definition Multimedia Interface), DP (DisplayPort), and DVI (Digital Visual Interface), including one or more of:
for HDMI video signals, processing of SCL ($I^2C$ serial clock for DDC (Display Data Channel)), SDA ($I^2C$ serial data for DDC), CEC (Consumer Electronics Control), HPD (Hot Plug Detect), and ARC (Audio Return Channel) signals,
for DVI video signals, processing of DDC and HPD signals, and
for DisplayPort video signals, processing of AUX (Auxiliary channel) and HPD signals.

12. The video signal transmission device of claim 11, wherein the fiber module complies with a SFP (Small Form-factor Pluggable) standard,
wherein the video signal transmission device further comprises a fiber module mounting frame mounted on the main circuit board, the fiber module mounting frame having a size and shape configured to accommodate the fiber module, wherein the fiber module is configured to be plugged into and unplugged from the fiber module mounting frame.

13. The video signal transmission device of claim 11, wherein the optical fiber connector is an MPO (Multi-fiber Push On) connector.

14. The video signal transmission device of claim 11, wherein the video signal processing chip has a size of ¼ inch by ¼ inch.

15. The video signal transmission device of claim 11, wherein the video signal processing chip is further programmed to control the optical transceiver.

16. The video signal transmission device of claim 11, wherein plurality of non-video signals includes one or more signals selected from a group consisting of audio signals, data signals for a peripheral device, network signals, RS-232 signals, and IR remote control signals, and the plurality of external electrical signal connectors includes one or more connectors selected from a group consisting of USB (Universal Serial Bus) connectors, Ethernet connectors, and RS-232 connectors.

17. A fiber optic cable device comprising:
a cable containing a plurality of optical fibers;
an optical fiber connector connected at one end of the cable; and
an electrical signal connector module connected at another end of the cable, the electrical signal connector module including:
a casing having a size no greater than 45 mm by 20 mm by 10 mm, a first end of the casing being connected to the cable;
an optical transceiver disposed within the casing and coupled to the plurality of optical fibers;
a video signal processing chip disposed within the casing and coupled to the optical transceiver, and programmed to perform video signal processing in compliance with a video transmission format selected from a group consisting of HDMI (High Definition Multimedia Interface), DP (DisplayPort), and DVI (Digital Visual Interface), including one or more of:
for HDMI video signals, processing of SCL ($I^2C$ serial clock for DDC (Display Data Channel)), SDA ($I^2C$ serial data for DDC), CEC (Consumer Electronics Control), HPD (Hot Plug Detect), and ARC (Audio Return Channel) signals,
for DVI video signals, processing of DDC and HPD signals, and
for DisplayPort video signals, processing of AUX (Auxiliary channel) and HPD signals; and
an electrical signal connector electrically coupled to the video signal processing chip and protruding from a second end of the casing.

18. The fiber optic cable device of claim 17, wherein the optical fiber connector is an MPO (Multi-fiber Push On) connector, and the electrical signal connector complies with the video transmission format selected from the group consisting of HDMI, DP, and DVI,
wherein the fiber optic cable device further comprises a USB (Universal Serial Bus) connector connected to the first end of the casing and electrically coupled to the signal processing chip or the electrical signal connector.

19. The fiber optic cable device of claim 17, wherein the video signal processing chip has a size of ¼ inch by ¼ inch.

* * * * *